(No Model.)

F. F. MARTIN & F. V. DE BEM.
GUARD FOR BICYCLE SEATS.

No. 524,640. Patented Aug. 14, 1894.

Witnesses

Sarepta Specht

Inventors
Francisco F. Martin
Francisco V. De Bem
By Attorneys
R. S. & A. P. Lacey

United States Patent Office.

FRANCISCO FRUCTUOSO MARTIN AND FRANCISCO VIEIRA DE BEM, OF GLOUCESTER, MASSACHUSETTS.

GUARD FOR BICYCLE-SEATS.

SPECIFICATION forming part of Letters Patent No. 524,640, dated August 14, 1894.

Application filed September 20, 1893. Serial No. 486,020. (No model.)

*To all whom it may concern:*

Be it known that we, FRANCISCO FRUCTUOSO MARTIN and FRANCISCO VIEIRA DE BEM, citizens of the United States, residing at Gloucester, in the county of Essex, State of Massachusetts, have invented certain new and useful Improvements in Guards for Bicycle-Seats; and we do hereby declare the following to be a full, clear, and exact description of the invention, such as will enable others skilled in the art to which it appertains to make and use the same.

This invention relates to a removable guard for bicycle seats; and is designed especially for lady riders to support and hold the clothing close to the figure.

The invention consists of the novel features and the peculiar construction and combination of the parts which will be hereinafter more fully described and claimed and which are shown in the annexed drawings, in which—

Figure 1:
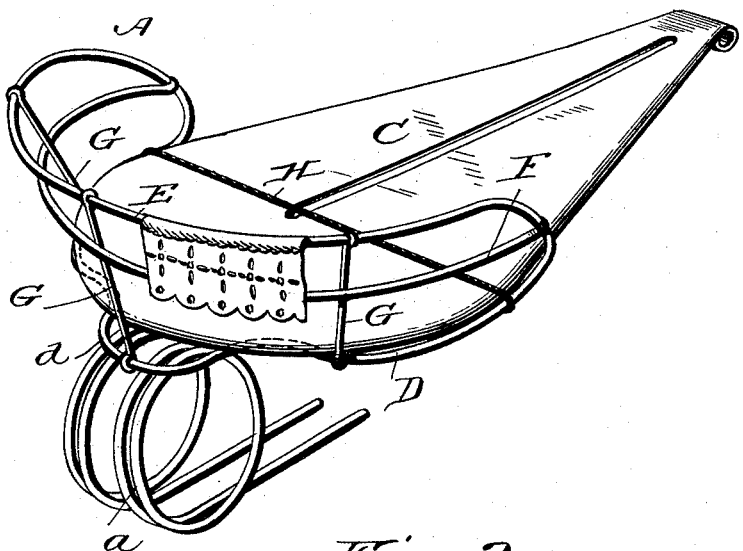
Figure 2:
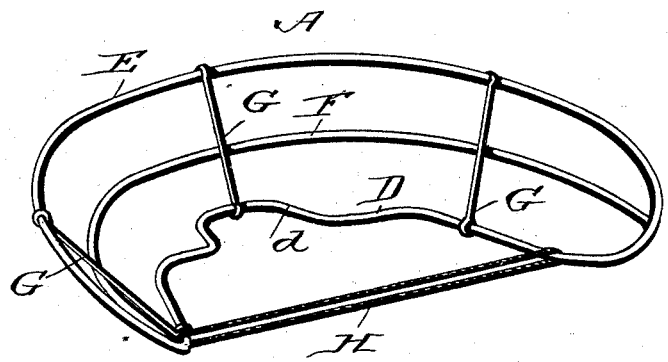

Figure 1 is a perspective view showing the application of the invention to a bicycle seat. Fig. 2 is a detail view of the guard.

The guard A is designed to be applied to a bicycle seat of ordinary construction such as indicated in the drawings. The guard flares outwardly from the lower to the upper portion and is constructed of stout wire to present a light and neat appearance. The lower wire D conforms to the rear portion of the seat C and is provided at its rear with a loop $d$ to extend around the rear spring $a$ of the bicycle seat. The upper wire E corresponds in shape to the outline of the lower wire D and has its front end curved downwardly and attached to the end portions of the said wire D. The space between the upper and lower wires is protected by suitable stay and strengthening wires which connect and hold the frame wires D and E in a fixed relative position. The intermediate wire F is approximately parallel with the wires D and E and the vertical wires G are attached at their ends to the frame wires and between their ends to the intermediate wires. A strap or elastic band H is attached at its ends to the ends of the guard and is designed to embrace the top and bottom sides of the seat to hold the guard in place.

The guard having the form substantially as herein shown and described is suitably upholstered and ornamented and is attached to the bicycle seat by having the lower frame wire D come beneath the rear portion of the seat C and the loop $d$ between the seat and the spring $a$, the strap or elastic band H embracing the top and bottom sides of the seat C and holding the guard in proper place.

Having thus described our invention, what we claim, and desire to secure by Letters Patent, is—

1. A removable guard for bicyle seats having its lower portion constructed to come beneath the bicycle seat, and having a strap or elastic band to embrace the top and bottom sides of the said bicycle seat to hold the guard in proper place, substantially as set forth.

2. A removable guard for a bicycle seat having its lower portion constructed to come beneath the said seat and having a looped portion $d$ to receive the rear spring of the bicycle seat, and having a strap or elastic band to embrace the top and bottom sides of the said seat and hold the guard in proper place, substantially as described.

3. The herein shown and described removable guard for a bicycle seat composed of the lower frame wire D conforming to the rear portion of the seat and having loop $d$, the upper frame wire E having its end curved and secured to the end portions of the lower frame wire, intermediate strengthening and brace wires connecting the upper and lower frame wires, and an elastic band or strap for securing the guard to the bicycle seat substantially in the manner set forth.

In testimony whereof we affix our signatures in presence of two witnesses.

FRANCISCO FRUCTUOSO MARTIN.
FRANCISCO VIEIRA DE BEM.

Witnesses:
GEORGE STEELE, Jr.,
WM. F. CORLISS.